Oct. 31, 1944. W. A. PROELL ET AL 2,361,651
DESULPHURIZING HYDROCARBON DISTILLATES
Filed Feb. 28, 1942
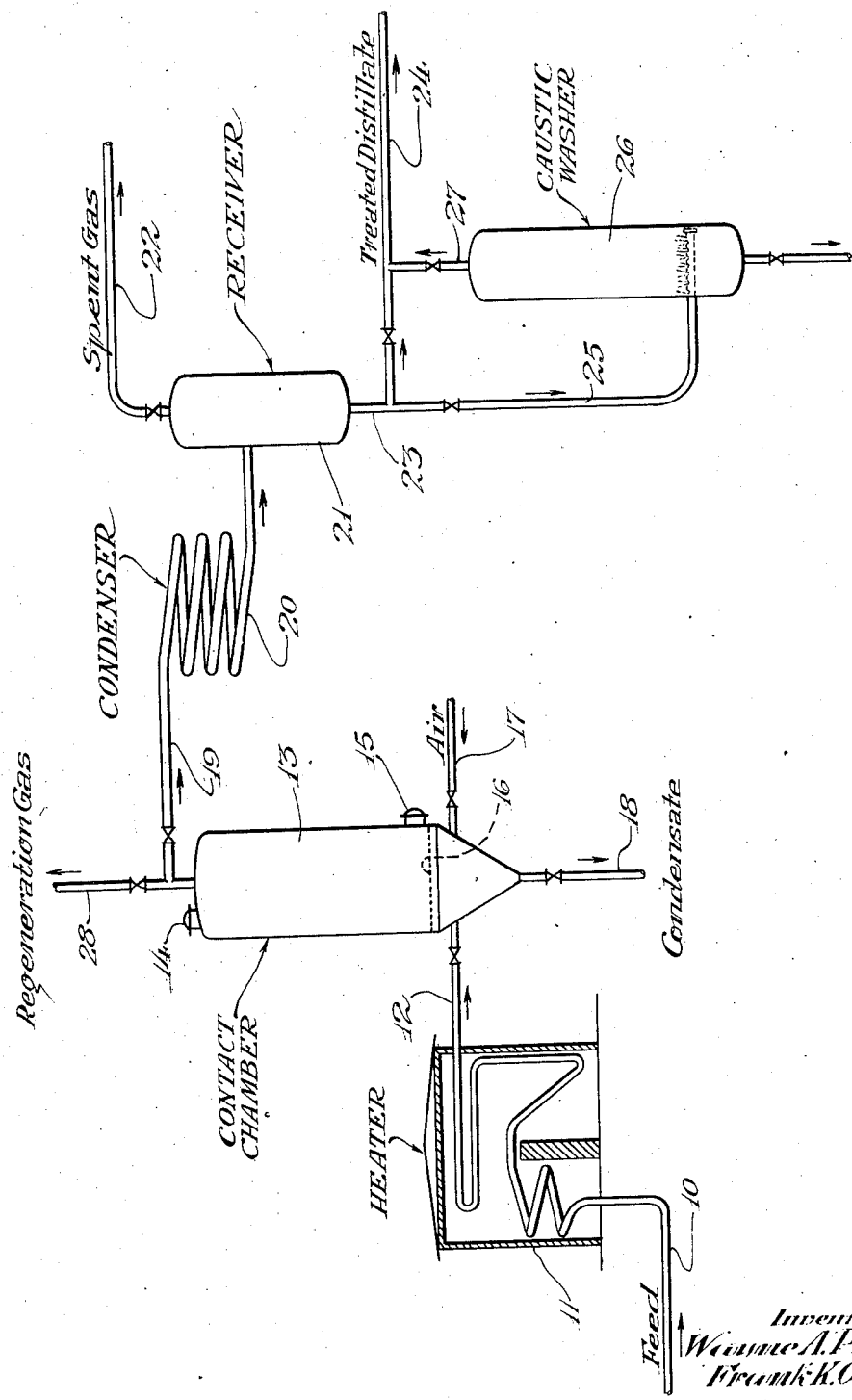

Patented Oct. 31, 1944

2,361,651

UNITED STATES PATENT OFFICE 2,361,651

DESULPHURIZING HYDROCARBON DISTILLATES

Wayne A. Proell, Chicago, Ill., and Frank K. Ovitz, Whiting, Ind., assignors to Standard Oil Company, Chicago, Ill., a corporation of Indiana Application February 28, 1942, Serial No. 432,876

11 Claims. (Cl. 196—28)

This invention relates to a process of sweetening and desulphurizing petroleum napthas, gasoline, kerosene and similar petroleum distillates contaminated with sulphur compounds. It relates more particularly to the catalytic treatment of petroleum distillates in the vapor phase to remove therefrom sulphur compounds affecting the Patterson-Sargent test hereinafter described. The process is applicable to cracked stocks as well as straight-run stocks.

One object of the invention is to refine napthas and petroleum distillates by contact catalysts in a manner to produce larger yields of satisfactory corrosion-free products than heretofore obtainable. Another object of the invention is to provide a catalyst for effecting the sweetening of sour petroleum distillates to a degree sufficient to have the product pass the Patterson-Sargent test. Still another object is to provide a desulphurizing catalyst having longer active life than possessed by catalysts heretofore employed.

The invention is illustrated by a drawing which shows diagrammatically an apparatus for contacting naptha vapors with contact catalysts made in accordance with this invention.

Referring to the drawing, the feed stock which may be a petroleum naptha or other light petroleum distillate may be charged by line 10 to heater 11 wherein it is vaporized and heated to the temperature desired for the reaction or a little above that temperature, to allow for heat losses in the reaction chamber. The vapors are thence conducted by line 12 to the catalyst contact chamber 13. This chamber may be provided with catalyst charge inlet 14 and discharge outlet 15. A foraminous plate or screen 16 may support the granular catalyst in a bed. Air or oxygen may be introduced at the desired rate by line 17. If desired, the air may be introduced into the vapors in line 12. Condensates which may form in the reaction chamber, especially when starting operations with a cold catalyst, are withdrawn by valved outlet 18.

The treated hydrocarbon vapors pass by vapor line 19 to condenser 20 and thence to receiver 21 from which spent gases, nitrogen, etc., are withdrawn by vapor line 22. If it is desired to further fractionate the distillate, this may be done by employing a fractionating tower between reactor 13 and condenser 20, the vapors being conducted to it by line 19.

The treated distillate is withdrawn from the receiver 21 by line 23 and thence discharged from the process by line 24. It is frequently desirable to wash the distillate with a caustic solution to remove dissolved $SO_2$ and sometimes a trace of $H_2S$ and this may be done by passing the distillate through valved line 25 to caustic washer 26 where the distillate is allowed to flow upwardly through a bath of caustic solution. The washed distillate is withdrawn by line 27 leading to treated distillate outlet 24.

After the catalyst in 13 has become exhausted, it may be withdrawn through 15 and replaced through 14. If desired, however, it may be regenerated in place by closing the vapor inlet line 12 and transfer line 19. Heated air supplied by line 17 may then be employed to regenerate the catalyst, the spent regeneration gases being discharged by valved line 28. After regeneration is complete the catalyst may be allowed to cool to the desired reaction temperature, for example, by passing cold air therethrough; vent 28 may be closed and the sweetening operation continued as before.

Previously, the testing of napthas generally required that they be made to pass the so-called "doctor" test which involves shaking a sample of the naptha with a solution of sodium plumbite in alkali and noting the formation of an insoluble lead mercaptide which appeared either as a coloration in the naptha or as a "rag" at the interface between the naptha and the water solution. For general purposes, this test proved satisfactory but it was later found that the test was not sufficiently stringent for napthas intended for special uses, particularly in the manufacture of paints, lacquers and varnishes. Small amounts of corrosive sulphur compounds in such napthas were found quite harmful to pigments and accordingly more stringent tests were devised to detect the presence of these undesirable corrosive sulphur compounds. It was also found that traces of organic disulphides in motor fuels lowered the knock rating and susceptibility to tetraethyl lead.

One test which has been found quite sensitive for detecting minute amounts of corrosive sulphur compounds is the Patterson-Sargent strip test which is carried out in the following manner: A strip of polished copper measuring ¼ inch by 1½ inches is placed in a standard A. S. T. M. distillation flask and 100 ml. of the naptha in question is added to the flask. The naptha is then distilled according to the standard A. S. T. M. distillation procedure until the end point is reached. The copper strip is then removed from the flask and cooled rapidly by immersing in a coolant such as cold naptha or acetone to avoid contact with air which would cause discoloration. The corrosive condition of the naptha sample is determined by the color of the copper strip. The naptha is rated No. 1 or perfect if there is no color change; No. 2 if the strip has a slight purplish tinge; No. 3 if the strip has the color of brass; No. 4 if the strip is iridescent or grayish in appearance, and No. 5 if the strip is sooty black.

Petroleum distillates sweetened by the earlier methods with doctor solution, for example, will not satisfactorily pass the Patterson test but invariably give gray or black strips. Accordingly, different refining methods must be resorted to in order to produce salable products which will meet this stringent specification. One of the methods found effective for this purpose is one wherein the naptha vapors are brought into contact with copper oxide or other copper compounds, preferably employed on a supporting material. The effectiveness of the copper compound has been found to vary considerably with the character of the supporting material with which it is associated such as the clays, bentonite, fuller's earth, etc., employed heretofore.

The yield of sweetened naptha obtainable by this process is very greatly increased by simultaneously introducing oxygen or air into the catalyst bed with the naptha vapors. The reaction involved in the process appears to be an oxidation of mercaptans, sulphides and disulphides to sulphur dioxide by the action of the copper catalyst in the presence of the oxygen. The amount of naptha lost in the process is small, usually less than 1%.

We have now discovered that the yields obtainable by this process can be very greatly increased by using a catalyst in which the copper compound is associated with a compound, particularly with oxides, hydroxides or carbonates of metals found in group II of the periodic system, more particularly magnesium, calcium, zinc, and barium. Sulphates and phosphates may also be used but are less preferred. The life of these catalysts is very much longer than the life of catalysts heretofore employed as indicated by the yield of sweetened distillate. Thus, a catalyst composed of copper oxide and magnesium carbonate gave, for one ton of catalyst, a yield of 4500 barrels of oleum spirits having a perfect Patterson-Sargent test and an additional yield of 6000 barrels of product testing No. 2 by the Patterson-Sargent test which would be quite satisfactory for almost all present commercial specifications. In comparison, copper oxide catalysts heretofore employed yielded only a few hundred barrels per ton of naptha of satisfactory corrosive characteristics. Furthermore, many of the catalysts heretofore employed were found incapable of producing any product whatever which satisfactorily passed the Patterson-Sargent test. Thus for example, copper oxide on chromium oxide gave a sour product while copper oxide on bauxite gave a very low yield of sweetened product, only 200 barrels per ton.

In carrying out our process we prefer to employ the following procedure: The naptha is vaporized preferably in a pipe heater in a continuous stream and the vapor is passed through a bed of catalyst at a temperature within the range of about 350 to 600° F. Higher temperatures than these are generally undesirable because of excessive oxidation of the hydrocarbons with the formation of aldehydes or other undesirable by-products. Atmospheric or slightly superatmospheric pressures, of the order of 25 to 50 pounds per square inch, are satisfactory. A stream of air is introduced with the catalyst at the rate of about ½ pound of air per barrel of naptha charged. The amount of air employed will vary considerably, depending upon the character of the naptha and the amount of sulphur compounds to be removed from it. Thus with Mid-Continent naptha containing about 0.03% sulphur and about 0.01% mercaptan sulphur, the minimum amount of air is about 0.3 pound per barrel of naptha. In general, the amount of air employed will be about $\frac{1}{10}$ to 10% by weight of the oil treated.

In addition to the group II metal oxides, hydroxides and carbonates, we may incorporate in our catalyst various plastic materials having the property of increasing the mechanical strength and hardness of the catalyst. Examples of such materials are the adsorbent earths such as bentonite, Wilkinite and montmorillonite clays, silica-alumina hydrogel, etc. The amount of these materials employed may vary considerably, generally in the range of about 5 to 75%. A typical catalyst made in this manner contained 18% of copper sulphate, 41% of magnesium carbonate, and 41% of Wilkinite. It was much stronger than the catalyst without the Wilkinite while exhibiting an equal or greater desulphurizing activity.

As a specific example of the preparation of our catalyst the following illustration is presented. To 1 kilogram of granular Attapulgus clay there was added 50 grams of powdered calcium oxide and 100 grams of powdered magnesium oxide. After mixing dry, sufficient water was stirred in to make a heavy paste. A solution of copper sulphate was prepared by dissolving 200 grams of the salt, $CuSO_4 \cdot 5H_2O$, in hot water and this solution was slowly added to the paste with stirring. After mixing to a homogeneous mass the paste was formed into lumps and allowed to dry. The dry lumps were crushed and screened to a size of 14 to 28 mesh. The catalyst was then ignited for 15 minutes at a moderate red heat, about 1000° F. On cooling the catalyst was ready for use. If desired, the paste may be washed with water before drying to remove soluble sulphates or other salts but this step is not necessary for the production of active catalysts.

In another example, 150 parts of Wilkinite was made into a very thick paste with 60 parts of copper sulphate dissolved in an excess of water. To the mixture was added 100 parts of magnesium carbonate and 250 parts of diatomaceous earth, mixed together with sufficient water to form a stiff mud. The two pastes were then mixed and kneaded thoroughly. Fifty (50) parts of additional dry Wilkinite clay was added. The mixture was further kneaded until homogeneous. The catalyst was dried, crushed, sized and ignited as previously. The product was very active and possessed considerable mechanical strength as well as a high porosity. It was used directly without pelleting or extrusion.

Gasoline sweetened by our catalytic process is characterized by an improved knock rating when compared with gasoline sweetened by ordinary methods such as the "doctor" method as the following results will indicate:

|  | Knock rating A. S. T. M. | |
|---|---|---|
|  | Doctor sweetened | Catalytically sweetened |
| Mid-Continent cracked gasoline unleaded | 66.6 | 67.2 |
| Same gasoline+1 cc. PbEt₄ | 73 | 73.9 |
| Same gasoline+3 cc. PbEt₄ | 78.1 | 78.9 |

A straight run heavy naptha from Mid-Continent crude gave the following results:

|  | Knock rating A. S. T. M. | |
|---|---|---|
|  | Doctor sweetened | Catalytically sweetened |
| Gasoline unleaded | 27.3 | 29.2 |
| Same gasoline+1 cc. PbEt₄ | 39.1 | 42.3 |
| Same gasoline+3 cc. PbET₄ | 50.8 | 54.1 |

The effect of temperature in the operation of our process was carefully studied and it was found that in the case of the particular Mid-Continent naptha employed, at temperatures below 400° F., the product obtained was not satisfactorily sweetened when tested by the Patterson-Sargent test. In this case, it was found desirable to operate above 440° F. Above 440° F. the temperature was substantially without effect on the desulphurization although excessive temperatures appreciably above 600° F. result in the formation of undesirable oxidation products as previously indicated.

The following data were obtained when feeding a sour naptha stock at the rate of 116 barrels per hour per ton of catalyst. The catalyst employed was made by mixing a solution of copper sulphate with a paste of magnesium carbonate (7%), calcium oxide (3.7%) and Attapulgus clay (74%), drying, crushing and sieving to pass 14 mesh and be retained by 28 mesh, and igniting to about 900° F. Air was simultaneously injected into the catalyst during the tests at the rate of 1.4 volumes of air per volume of liquid naptha charged.

| Temperature, °F. | Percent sulphur | Patterson test |
|---|---|---|
| 400 | 0.045 | Grey. |
| 420 | 0.028 | Do. |
| 440 |  | Perfect. |
| 460 | 0.029 | Trace purple. |
| 480 | 0.026 | Almost perfect. |
| 500 | 0.025 | Perfect. |
| 520 | 0.038 | Do. |
| 540 | 0.030 | Do. |
| 560 | 0.020 | Do. |

In the above tests the naptha was obtained sweet directly from the condenser after passing through the catalyst when the temperature was within the range of 440° F. to 500° F. At temperatures much above 500° F. the product was slightly sour but this sourness was removed immediately by washing with a caustic solution. Tests have shown that this sourness is entirely $H_2S$. On account of this $H_2S$ formation, we prefer to operate at temperatures below about 500 to 550° F.

When operating at a temperature of 440° F. and air ratio of 1.4 volumes per volume of liquid naptha treated, we found that the rate of naptha feed could be varied within the range of about 25 to 150 barrels per hour per ton of catalyst and produce a sweet product. In general, feed rates at about the middle of this range, 50 to 100 barrels per hour per ton, appear to be advantageous from the standpoint of producing a consistently satisfactory product. With certain very active catalysts, such as CuO and $MgO_3$, feed rates as high as 260 barrels per hour per ton were attained, but the catalyst was too soft for practical use. The following data show the results of one series of tests in which the feed rate was varied with a typical CuO-MgO-CaO catalyst:

| Feed rate, barrels per ton per hour | Doctor test | Patterson-Sargent test |
|---|---|---|
| 40 | Sweet | Perfect. |
| 58 | do | Do. |
| 73 | do | Do. |
| 87 | do | Slight purple. |
| 101 | do | Purple. |
| 116 | do | Perfect. |
| 130 | do | Slight purple. |
| 145 | Sour | Iridescent grey. |

Tests made to determine the amount of air required for carrying out the process indicate that in general a minimum of one volume of air should be employed per volume of liquid naptha charged. Larger amounts of air are substantially without effect with most napthas although in the case of very sour high sulphur stocks the amount of air may need to be increased, for example, up to 1.5 to 3 or even 10 volumes of air per volume of stock charged. In the case of very low sulphur stocks as little as 0.5 volume of air per volume of stock may be employed. Excess air does no particular harm if kept sufficiently low to avoid explosion hazards. To obtain minimum losses, however, the correct amount of air should be used.

The following data show the results obtained in the sweetening of oleum spirits which is a naptha fraction from Mid-Continent crude oil having the following boiling range:

|  | °F |
|---|---|
| Initial | 304 |
| 10% | 321 |
| 50% | 349 |
| 90% | 392 |
| End point | 427 |

The stock was charged to the catalyst at the rate of 116 barrels per hour per ton at a temperature of 445° F.

| Air ratio volume of air per volume of liquid naptha | Doctor test | Patterson-Sargent strip test |
|---|---|---|
| 0.5 | Sour | Iridescent grey |
| 1 | Trace sour | Blue-purple. |
| 1.2 | Sweet | Perfect. |
| 1.25 | do | Do. |
| 1.37 | do | Do. |
| 1.75 | do | Do. |

We find in general that the life of our catalyst may be increased by reducing the feed rate, which in fact increases the time of contact between the oil vapor and catalyst. However, for practical purposes it is not generally desirable to reduce the feed rate below about 25 to 50 barrels per hour per ton, especially when treating low sulphur napthas which can be sweetened at far higher rates with fresh catalyst. When the catalyst fails to produce a satisfactory product at this rate as indicated by the Patterson-Sargent test, it is desirable to replace the catalyst or regenerate it.

Regeneration may be accomplished by oxidation in situ or in a separate operation. Igniting the catalyst in the presence of air for one hour at a temperature of about 1000° F. has been found to restore catalytic activity. In general, we prefer to pass a current of heated air through the catalyst bed maintaining the temperature of the catalyst within the range of about 800 to 1200° F., thereby burning off carbonaceous matter and oxidizing metallic sulphides.

In preparing our catalysts we prefer to use mixtures of two or more oxides of group II metals in combination with copper. As an example, an excellent catalyst may be made from copper oxide, calcium oxide and magnesium oxide. One such catalyst was made employing 11 parts of copper oxide, 10 parts of calcium oxide and 10 parts of magnesium oxide supported on 200 grams of burned Olmstead clay. When the copper oxide was used alone on the clay, the maximum yield of sweet products was 1000 barrels per ton whereas with the group II metal oxides present, the yield considerably exceeded 8300 barrels per ton.

In preparing our catalyst we may mix copper oxide or other insoluble copper salt such as the hydroxide or carbonate directly with the group II metal compound and this may be done by grinding the finely powdered copper compound with the group II metal oxide, hydroxide or carbonate in a ball mill, preferably while wet. Clay may be added to the mixture at this time. The wet mixture is then dried and crushed to size or it may be extruded or ground and pelleted. Other insoluble copper compounds may be employed with this method if desired, for example, copper oxalate or copper resinate. In the case where organic copper compounds are employed, it is desirable to ignite the catalyst in the presence of air to decompose and remove organic material before using the catalyst.

In general, we prefer to add soluble copper salts in water solution to the group II metal compound with or without the addition of clays as hereinbefore indicated. Copper sulphate, copper nitrate and copper acetate are examples of readily available copper salts suitable for making the catalyst. In general, our data indicate chloride ions should be avoided. The amount of copper incorporated in our catalyst is preferably about 1 part of copper oxide to 1 to 10 parts of the group II metal oxide or oxide mixture.

The chemical reactions involved in our process are apparently quite complicated. Analyses of the effluent gases indicate that oxidation is the principal reaction so that $CO_2$ is the principal product with sulphur dioxide occurring as the principal sulphur compound removed from the hydrocarbon. The following results were obtained by treating oleum spirits with a catalyst made from copper oxide, calcium oxide and magnesium oxide deposited on Olmstead clay, employing about 1 volume of air per volume of stock treated.

|  | Per cent |
|---|---|
| Nitrogen | 88.8 |
| Oxygen | 6.4 |
| $SO_2 + CO_2$ (chiefly $CO_2$) | 3.9 |
| CO | 0.6 |
| Hydrogen | 0 |
| Saturated hydrocarbons | 0 |
| Unsaturated hydrocarbons | 0.3 |

Although we have described our invention with respect to certain specific examples thereof, we intend that it be defined by the claims which follow. Where the term "barrel" is used in this specification it refers to the standard barrel of 42 U. S. gallons.

We claim:

1. The process of sweetening and desulphurizing sour hydrocarbon distillates which comprises contacting the vapors of said distillates in the presence of oxygen with a catalyst comprised of copper oxide in combination with at least an equal amount of an oxide, hydroxide or carbonate of a metal selected from the class consisting of magnesium, calcium and barium.

2. The process of sweetening and desulphurizing petroleum distillates which comprises contacting the vapors of said distillates in the presence of oxygen with a catalyst comprised of a mixture of copper oxide, calcium oxide and magnesium oxide.

3. The process of claim 2 wherein the proportion of copper oxide in said catalyst mixture is about ½ to 1/10 of the calcium and magnesium oxides.

4. The process of sweetening and desulphurizing naphthas comprising contacting the vapors of said naphthas in the presence of oxygen at a temperature of about 400 to 600° F. with a catalyst prepared from an intimate mixture of copper oxide and at least an equal amount of an oxide of a metal selected from the class consisting of magnesium, calcium and barium.

5. The process of claim 4 wherein the temperature is maintained at about 450 to 550° F.

6. The process of sweetening and desulphurizing petroleum distillates which comprises contacting the vapors of said distillates in the presence of air with a solid contact catalyst at a rate of about 25 to 250 barrels of distillate per hour per ton of catalyst, said catalyst being comprised of a mixture of copper oxide and at least an equal amount of an oxide of a metal selected from the class consisting of magnesium, calcium and barium.

7. The process of sweetening and desulphurizing sour petroleum distillates to render them non-corrosive according to the Patterson-Sargent copper strip test which comprises contacting the vapors of said distillates in the presence of air with a solid catalyst consisting essentially of copper oxide and at least an equal amount of magnesium oxide maintained at a temperature of about 400 to 600° F., the rate of contact of said distillate with said catalyst being about 25 to 250 barrels of liquid distillate per hour per ton of catalyst.

8. The process of sweetening and desulphurizing sour hydrocarbon distillates which comprises contacting the vapors of said distillates in the presence of oxygen with a catalyst comprised of copper oxide in combination with at least an equal amount of an oxide, hydroxide or carbonate of a metal selected from the class consisting of magnesium, calcium and barium, said catalyst being supported on an adsorbent earth.

9. The process of sweetening and desulphurizing petroleum distillates which comprises contacting the vapors of said distillates in the presence of oxygen with a catalyst comprised of a mixture of copper oxide and at least an equal amount of calcium oxide.

10. The process of sweetening and desulphurizing petroleum distillates which comprises contacting the vapors of said distillates in the presence of oxygen with a catalyst comprised of a mixture of copper oxide and at least an equal amount of magnesium oxide.

11. The process of refining sour petroleum distillates to make them perfectly sweet according to the Patterson-Sargent strip test which comprises contacting the vapors of said distillates at about 350 to 600° F. in the presence of air in the amount of about 0.1% to 10% by weight of the distillate treated, with a solid catalyst composed of a mixture of copper oxide and at least an equal amount of an oxide, hydroxide or carbonate of a metal selected from the class consisting of magnesium, calcium and barium.

WAYNE A. PROELL.
FRANK K. OVITZ.